United States Patent
Sakurai et al.

(10) Patent No.: US 12,277,473 B2
(45) Date of Patent: Apr. 15, 2025

(54) WIRELESS TAG READING APPARATUS

(71) Applicant: Toshiba Tec Kabushiki Kaisha, Tokyo (JP)

(72) Inventors: Wataru Sakurai, Shizuoka (JP); Yuichiro Kawabe, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/543,662

(22) Filed: Dec. 18, 2023

(65) Prior Publication Data

US 2024/0119241 A1    Apr. 11, 2024

Related U.S. Application Data (63) Continuation of application No. PCT/JP2022/017470, filed on Apr. 11, 2022.

(30) Foreign Application Priority Data

Jul. 2, 2021    (JP) .................................. 2021-110505

(51) Int. Cl.
  *G06K 7/10*    (2006.01)

(52) U.S. Cl.
  CPC .................. *G06K 7/10366* (2013.01)

(58) Field of Classification Search
  CPC ........... G06K 7/10366; G06K 7/10425; G06K 7/10297; G07G 1/0018; G07G 1/0036;
  (Continued)

(56) References Cited

U.S. PATENT DOCUMENTS

2012/0161944 A1*  6/2012  Chen ...................... G06K 17/00
                                                  340/10.6
2015/0127362 A1   5/2015  DeBusk et al.
(Continued)

FOREIGN PATENT DOCUMENTS

JP    2010267010 A    11/2010
JP    2015-207119 A    11/2015
(Continued)

OTHER PUBLICATIONS

International Search Report (ISR) and Written Opinion mailed Jun. 28, 2022 in International Application No. PCT/JP2022/017470, with Translation of the ISR, 9 pages.
(Continued)

*Primary Examiner* — Jamara A Franklin
(74) *Attorney, Agent, or Firm* — Kim & Stewart LLP (57) ABSTRACT

A wireless tag reading apparatus according to an embodiment includes an accommodation part formed by a bottom surface part and a peripheral surface part vertically provided upward from the bottom surface part, a peripheral surface opening part that is formed in the peripheral surface part, and enables goods to be taken into and out of the accommodation part, a cover part covering a part of an upside of the accommodation part, a top surface opening part formed by the cover part and the peripheral surface part, and contiguous to the peripheral surface opening part, and a reading part configured to read, by transmitting and receiving radiowaves to and from a wireless tag attached to goods accommodated in the accommodation part, tag information from the wireless tag.

8 Claims, 5 Drawing Sheets

(58) Field of Classification Search
CPC ........ G07G 1/0045; G07G 1/009; G07G 1/01; H01Q 1/2216; H01Q 21/28; G06Q 20/18; G06Q 20/20; G06Q 20/204; G06Q 20/208; G06Q 20/209; G06Q 20/32; G06Q 20/34; G07F 7/088
See application file for complete search history.

(56) References Cited

U.S. PATENT DOCUMENTS

| | | |
|---|---|---|
| 2015/0302379 A1 | 10/2015 | Terahara |
| 2017/0372290 A1 | 12/2017 | Terahara et al. |
| 2017/0372562 A1 | 12/2017 | Terahara et al. |
| 2019/0244069 A1 | 8/2019 | Oishi et al. |
| 2020/0066114 A1 | 2/2020 | Terahara |
| 2020/0090154 A1 | 3/2020 | Terahara et al. |
| 2020/0302257 A1 | 9/2020 | Oishi et al. |
| 2021/0024112 A1* | 1/2021 | Ting ..................... B62B 5/0096 |
| 2022/0051066 A1 | 2/2022 | Oishi et al. |

FOREIGN PATENT DOCUMENTS

| | | | |
|---|---|---|---|
| JP | 2017228138 A | 12/2017 | |
| JP | 2018160090 A | 10/2018 | |
| JP | 2018-190255 A | 11/2018 | |
| JP | 2019-139580 A | 8/2019 | |

OTHER PUBLICATIONS

Extended European Search Report mailed Jan. 8, 2025 in corresponding European Patent Application No. 22832569.2, 9 pages.
Notice of Reasons for Refusal (Office Action) dated Feb. 12, 2025 in corresponding Japanese Patent Application No. 2021-110505 with English machine translation (6 pages).

* cited by examiner

WIRELESS TAG READING APPARATUS

CROSS-REFERENCE TO RELATED APPLICATIONS

This application is a continuation application of International Application No. PCT/JP2022/017470, filed Apr. 11, 2022, which designates the United States, and which claims the benefit of priority from Japanese Patent Application No. 2021-110505, filed Jul. 2, 2021, the entire contents of which are incorporated herein by reference.

FIELD

An embodiment of the present invention relates to a wireless tag reading apparatus.

BACKGROUND

In recent years, for example, in stores such as mass merchandiser markets of apparel (clothes) and supermarkets, a wireless tag reading apparatus that attaches a wireless tag to a product to be sold in the store, and reads information regarding a product to be purchased by a customer, from the wireless tag has been employed. The wireless tag reading apparatus reads tag information using a radio frequency identification (RFID) technology. A product to be purchased by a customer is put into a basket, for example, and brought into a payment counter. The wireless tag reading apparatus provided in the payment counter accommodates a basket containing a product, into an accommodation part, and an antenna transmits and receives radiowaves to and from a wireless tag attached to the product. The wireless tag reading apparatus thereby reads tag information from the wireless tag.

The tag information read by the wireless tag reading apparatus, including information regarding a product such as a product code for identifying a product, for example, is transmitted to a point of sales (POS) terminal. The POS terminal performs account processing based on the received information regarding the product. The account processing refers to processing for paying for a product to be purchased by a customer. The POS terminal includes a POS terminal to be operated by a store salesperson, and a self POS terminal to be operated by a customer itself.

As a wireless tag reading apparatus of this type, there has been known a wireless tag reading apparatus including a box-shaped accommodation part having an opened top surface (for example, Patent Literature 1). The wireless tag reading apparatus has a box shape in which only the top surface of the accommodation part is opened. With this configuration, radiowaves are prevented from leaking to the outside, and the wireless tag reading apparatus maintains reading performance by ensuring radio field intensity inside the accommodation part.

Nevertheless, in the above-described prior art, because a customer needs to accommodate the basket into the accommodation part from the top surface opening by holding the basket up, there is room for improvement from the aspect of operability. With intent to improve operability, some wireless tag reading apparatuses have a shape in which not only the top surface of the accommodation part but also a front surface of the accommodation part is opened, but in this case, there is concern that reading performance declines due to the leakage of radiowaves. Thus, the wireless tag reading apparatus is demanded to improve operability while suppressing a decline in reading performance. Note that this demand is not limited to a wireless tag reading apparatus connected to the above-described POS terminal.

It is thus preferable to provide a wireless tag reading apparatus that can improve operability while suppressing a decline in reading performance.

DETAILED DESCRIPTION

According to one embodiment, a wireless tag reading apparatus includes, an accommodation part formed by a bottom surface part and a peripheral surface part vertically provided upward from the bottom surface part, a peripheral surface opening part that is formed in the peripheral surface part, and enables goods to be taken into and out of the accommodation part, a cover part covering a part of an upside of the accommodation part, a top surface opening part formed by the cover part and the peripheral surface part, and contiguous to the peripheral surface opening part, and a reading part configured to read, by transmitting and receiving radiowaves to and from a wireless tag attached to goods accommodated in the accommodation part, tag information from the wireless tag.

Hereinafter, a wireless tag reading apparatus according to an embodiment will be described with reference to the drawings. Note that the invention is not limited by the embodiment to be described below. For example, in the present embodiment, the description will be given of an example in which a wireless tag reading apparatus is used in a self POS terminal to be used in a mass merchandiser market or the like, but the present invention is not limited to this. The wireless tag reading apparatus is only required to read tag information using radiowaves from an RF tag (hereinafter, will be referred to as a wireless tag) attached to goods. The wireless tag reading apparatus can be widely applied to other fields such as a field of a terminal to be used for parts control in a factory, for example.

Figure 1:
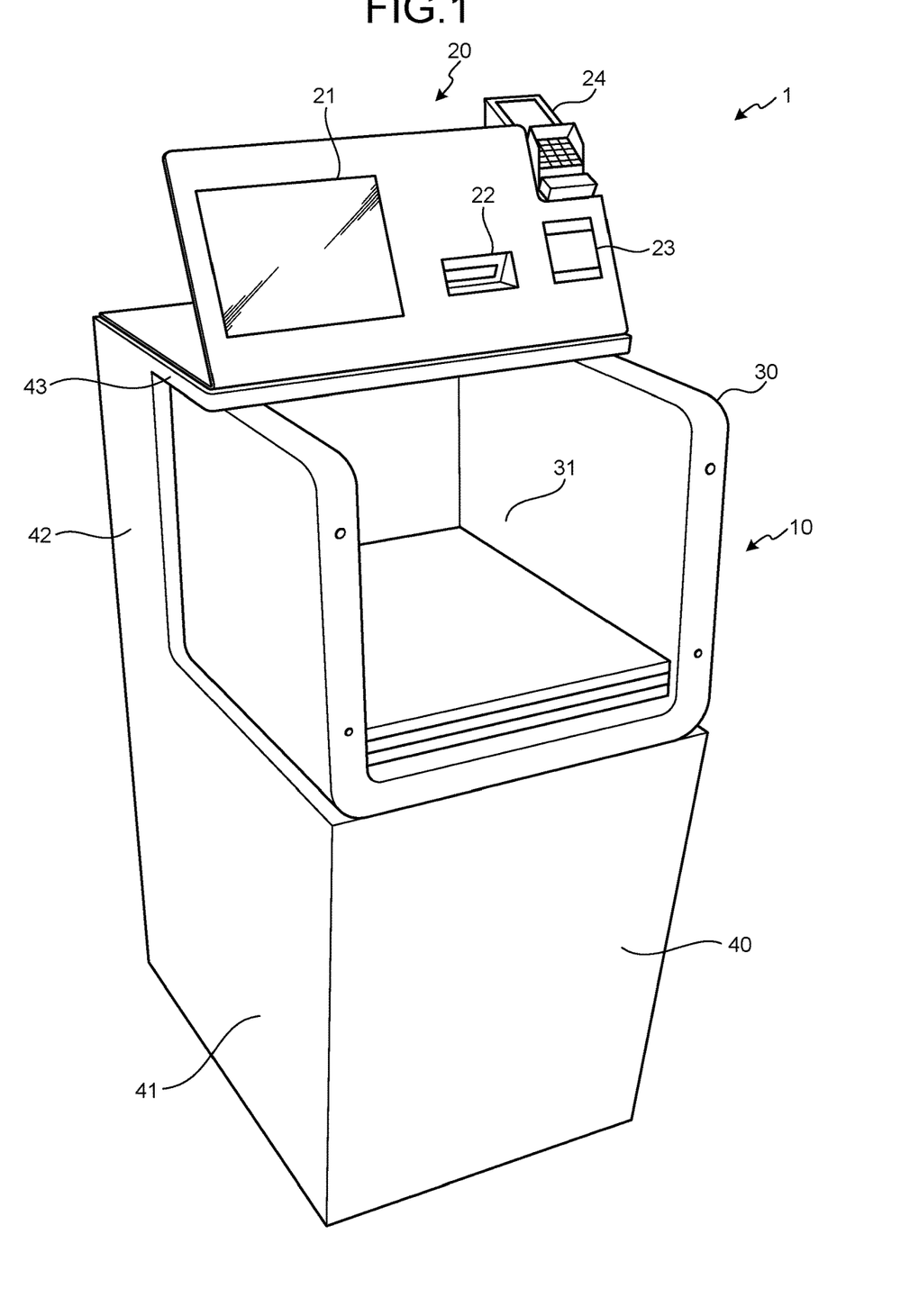
FIG. 1 is a perspective view illustrating the external appearance of a self POS terminal including a wireless tag reading apparatus according to an embodiment.

FIG. 1 is a view illustrating the external appearance of a self POS terminal including a wireless tag reading apparatus. A self POS terminal 1 is arranged in a payment counter of a mass merchandiser market, for example, and is a apparatus on which a customer performs the registration of products (clothing, food goods, etc.) to be purchased by the customer, and operations related to account processing, by himself/herself. The self POS terminal 1 includes a wireless tag reading apparatus 10 and a sales data processing apparatus 20.

The wireless tag reading apparatus 10 is a apparatus that uses the RFID technology. By transmitting and receiving radiowaves to and from a wireless tag attached to a product to be purchased by a customer being a user, the wireless tag reading apparatus 10 reads a product code or the like that is information for identifying the product that is stored in the wireless tag. The wireless tag reading apparatus 10 transmits the read product code to the sales data processing apparatus 20. Here, the product is an example of goods, and the product code is an example of tag information. Note that the wireless tag reading apparatus 10 also reads, from the wireless tag, other types of tag information such as an individual item code for identifying an individual item.

The wireless tag reading apparatus 10 includes a reading unit 30 and a housing 40. The reading unit 30 includes an accommodation part 31 that accommodates products. The housing 40 supports the reading unit 30, and includes a housing lower part 41 positioned below the reading unit 30, a housing back part 42 positioned on the back surface of the reading unit 30, and a housing upper part 43 positioned above the reading unit 30. The housing 40 may support the reading unit 30 by fixing the reading unit 30, or may support the reading unit 30 by placing or pinching the reading unit 30 without fixing the reading unit 30. The details of the wireless tag reading apparatus 10 will be described later.

The sales data processing apparatus 20 performs registration (hereinafter, will also be referred to as product registration) of product information (product name, price, etc.) of a product to be purchased by a customer, based on information acquired from the wireless tag reading apparatus 10, and executes processing (hereinafter, will also be referred to as account processing) related to payment for a product having been subjected to product registration.

A control device and various devices that are included in the sales data processing apparatus 20 are provided in the housing 40. The sales data processing apparatus 20 includes a display 21, a receipt issuance port 22, a scanner 23, and a card reader 24. The display 21, the receipt issuance port 22, the scanner 23, and the card reader 24 are installed in the housing upper part 43.

The display 21 displays various types of information. The display 21 displays, for example, product information of a product identified based on a product code read by the wireless tag reading apparatus 10, guidance for guiding the operation of the self POS terminal 1, an operating element for a customer performing operations, and the like. Note that a touch panel (not illustrated) is provided on the surface of the display 21. If a customer touches an operating element displayed on the display 21, information corresponding to the operating element is input to a control unit 25 (refer to FIG. 2) of the sales data processing apparatus 20.

Figure 2:
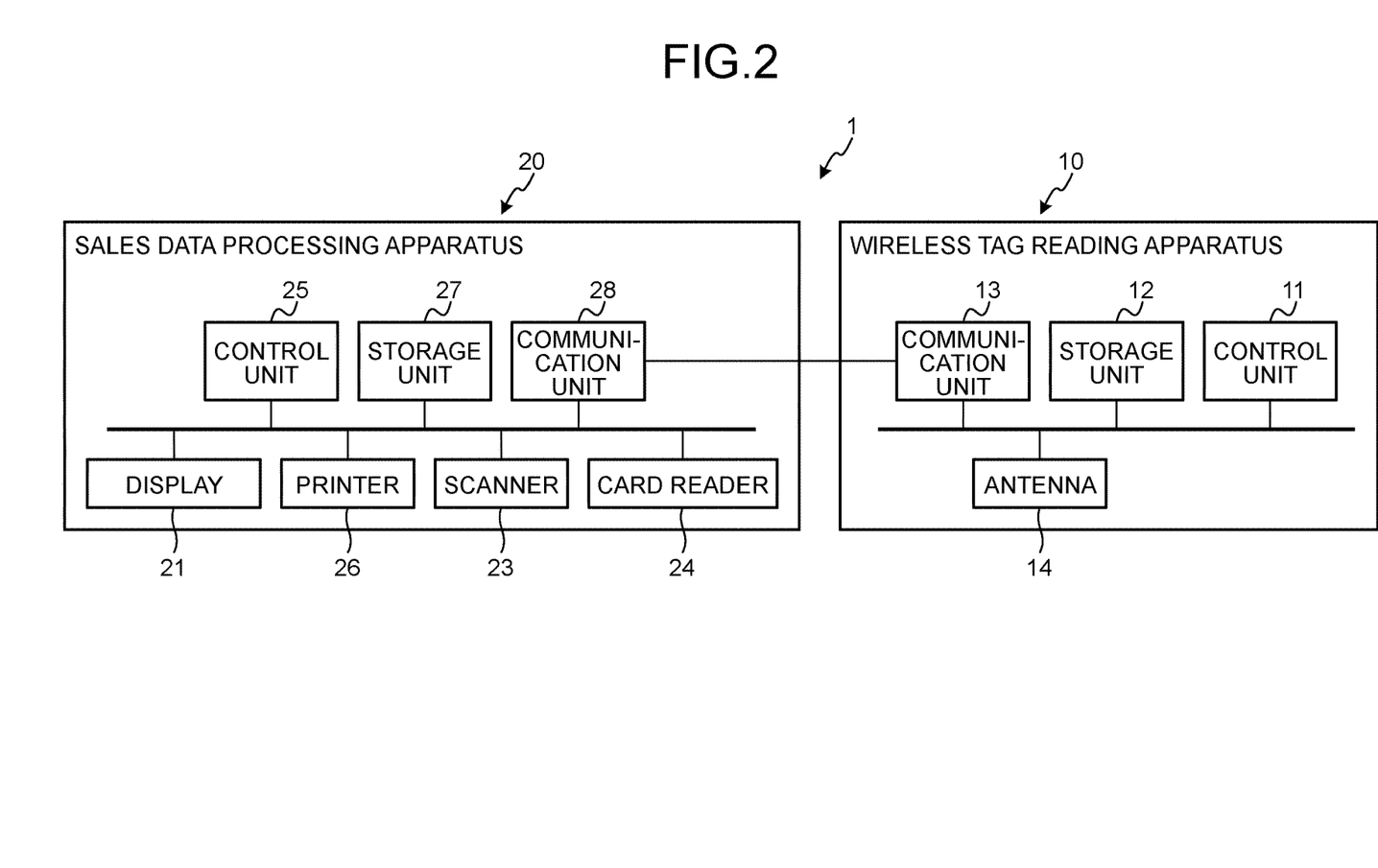
FIG. 2 is a block diagram illustrating a hardware configuration of a self POS terminal according to an embodiment.

The receipt issuance port 22 is an opening for discharging receipts printed by a printer 26 (refer to FIG. 2). Information regarding deals, such as a product name, a unit price, and a total amount, for example, is printed on a receipt discharged from the receipt issuance port 22.

The scanner 23 reads various types of information. For example, in a case where a customer makes payment by two-dimensional code payment, the scanner 23 reads a two-dimensional code displayed on a mobile terminal of the customer. In addition, in a case where a wireless tag attached to a product is damaged, the scanner 23 reads a product code from a code symbol such as a barcode that is separately attached to the product. Furthermore, the scanner 23 can read information regarding a coupon issued by a store, or the like from a code symbol displayed on a mobile terminal of a customer.

In a case where a customer makes payment by a credit card, the card reader 24 reads credit information from the credit card of the customer. In addition, the card reader 24 reads a member code from a medium such as a membership card or a rewards card of the customer. The card reader 24 may be a magnetic card reader that reads information from a magnetic card, or may be an IC card reader that reads information from a card having an embedded IC chip.

FIG. 2 is a block diagram illustrating a hardware configuration of the self POS terminal 1. As described above, the self POS terminal 1 includes the wireless tag reading apparatus 10 and the sales data processing apparatus 20. Note that, in the present embodiment, the self POS terminal 1 is an apparatus dedicated for cashless payment such as credit payment and two-dimensional code payment, but cash payment can also be enabled by including a change machine.

The wireless tag reading apparatus 10 includes a control unit 11, a storage unit 12, a communication unit 13, and an antenna 14. The control unit 11, the storage unit 12, the communication unit 13, and the antenna 14 are connected via a bus or the like.

The control unit 11 controls the operations of the entire wireless tag reading apparatus 10. The control unit 11 includes a computer including a Central Processing Unit (CPU), a Read Only Memory (ROM), and a Random Access Memory (RAM).

The CPU controls the operations of the entire wireless tag reading apparatus 10. The ROM stores various programs such as a program to be used for the driving of the CPU, and various types of data. The RAM is used as a work area of the CPU, and various programs and various types of data that are stored in the ROM and the storage unit 12 are loaded onto the RAM. By the CPU operating in accordance with control programs stored in the ROM and the storage unit 12 and loaded onto the RAM, the control unit 11 executes various types of control processing of the wireless tag reading apparatus 10.

The storage unit 12 includes a storage medium such as a Hard Disk Drive (HDD) or a flash memory, for example, and maintains stored content even if the power is shut off. The storage unit 12 stores various control programs such as a program for controlling the antenna 14, and a program for reading tag information based on radiowaves received by the antenna 14.

The communication unit 13 is an interface for communicating with an external apparatus such as the sales data processing apparatus 20. By being connected with the above-described external apparatus via the communication unit 13, the control unit 11 becomes able to transmit and receive information (data) to and from the external apparatus.

A plurally of antennas 14 is provided in the reading unit 30. The antenna 14 transmits radiowaves in accordance with an instruction from the control unit 11, and receives radiowaves (hereinafter, will also be referred to as answering waves) transmitted by a wireless tag in response to the transmitted radiowaves (hereinafter, will also be referred to as carrier waves). The control unit 11 reads tag information such as a product code by decoding answering waves received by the antenna 14. The antenna 14 forms a reading part together with the control unit 11. Note that the decoding of answering waves received by the antenna 14 may be performed in the sales data processing apparatus 20. In this case, a reading part is formed together with the sales data processing apparatus 20.

The sales data processing apparatus 20 includes the display 21, the scanner 23, the card reader 24, the control unit 25, the printer 26, a storage unit 27, and a communication unit 28. The display 21, the scanner 23, the card reader 24, the control unit 25, the printer 26, the storage unit 27, and the communication unit 28 are connected via a bus or the like.

The configurations and functions of the display 21, the scanner 23, and the card reader 24 are as described above. The printer 26 prints a receipt and discharges the receipt from the receipt issuance port 22.

The control unit 25 controls the operations of the entire sales data processing apparatus 20. The control unit 25 includes a computer including a CPU, a ROM, and a RAM.

The CPU controls the operations of the entire sales data processing apparatus 20. The ROM stores various programs such as a program to be used for the driving of the CPU, and various types of data. The RAM is used as a work area of the CPU, and various programs and various types of data that are stored in the ROM and the storage unit 27 are loaded onto the RAM. By the CPU operating in accordance with control programs stored in the ROM and the storage unit 27 and loaded onto the RAM, the control unit 25 executes various types of control processing of the sales data processing apparatus 20.

The storage unit 27 includes a storage medium such as an HDD or a flash memory, for example, and maintains stored content even if the power is shut off. The storage unit 27 stores various control programs such as a program for executing product registration based on information acquired from the wireless tag reading apparatus 10, and a program for executing account processing. In addition, the storage unit 27 stores a product master being a master file in which information regarding products handled in stores is registered. In the product master, a product code for identifying a product, and product information such as a product name and a price are associated. The control unit 25 acquires a product code read by the wireless tag reading apparatus 10 from a wireless tag, reads out product information corresponding to the product code, from the product master, and registers the product information into the RAM. Product registration is thereby executed. Note that, because products handled in stores change on a daily basis, the product master is appropriately updated.

The communication unit 28 is an interface for communicating with an external apparatus such as the wireless tag reading apparatus 10 and a store server (not illustrated). By being connected with the above-described external apparatus via the communication unit 28, the control unit 25 becomes able to transmit and receive information (data) to and from the external apparatus.

Figure 3:
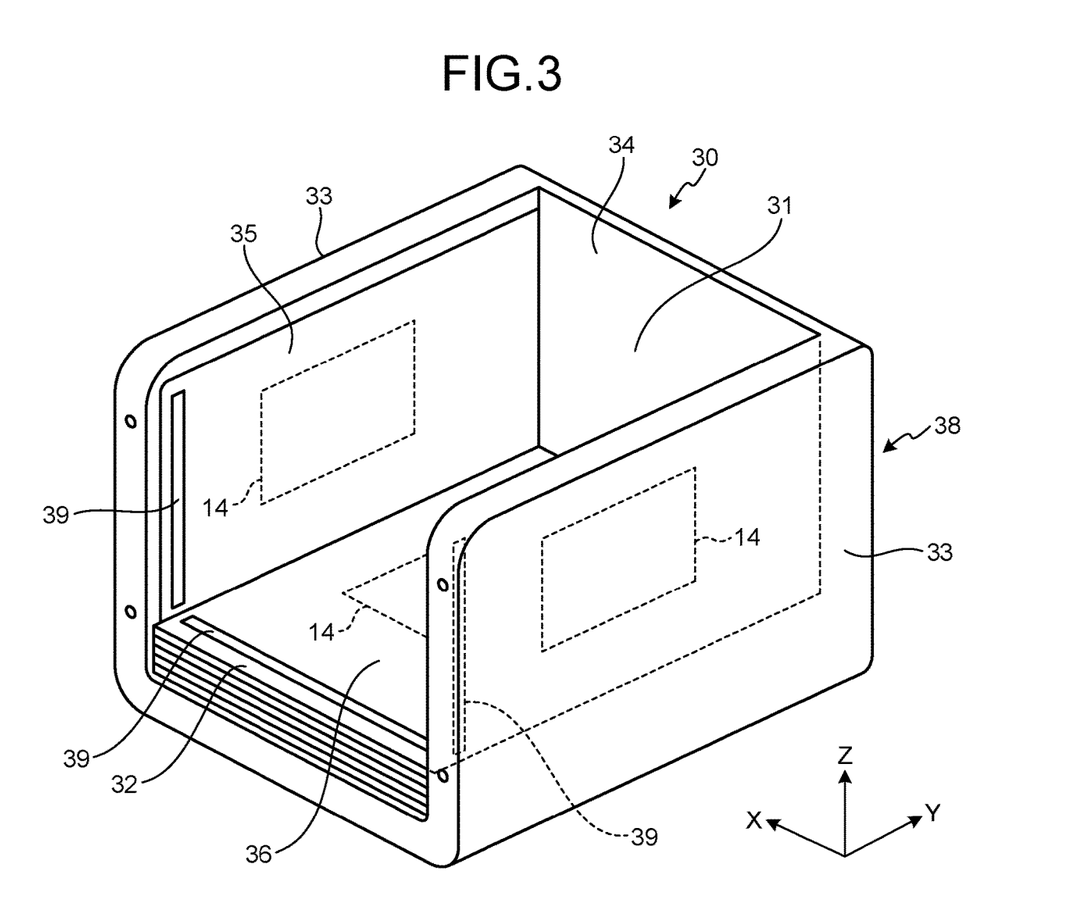
FIG. 3 is a perspective view illustrating the external appearance of a reading unit of wireless tag reading apparatus according to an embodiment.

Next, a configuration of the wireless tag reading apparatus 10 will be described in detail. FIG. 3 is a perspective view illustrating the external appearance of the reading unit 30 included in the wireless tag reading apparatus 10. The reading unit 30 includes a bottom surface part 32, a side surface part 33, and a back part 34, and is formed into a cuboid shape in which two surfaces are opened. Note that, in the following description, an arrow X direction in FIG. 3 will be referred to as a left-right direction, an arrow Y direction will be referred to as a front-back direction, and an arrow Z direction will be referred to as a height direction in some cases. In addition, a side on which the back part 34 is positioned in the front-back direction will be referred to as a rear side in some cases.

The bottom surface part 32 is formed into a rectangular shape, and functions as an accommodation member (not illustrated) such as a basket into which a product to be purchased by a customer being a user of the wireless tag reading apparatus 10 is to be accommodated, or a placement surface on which the product is directly placed. A pair of side surface parts 33 are vertically provided upward from left and right ends of the bottom surface part 32 with facing each other in the left-right direction. Note that, in a case where the pair of left and right side surface parts 33 are collectively referred to without distinction, the left and right side surface parts 33 are sometimes simply referred to as the side surface parts 33. A corner part connecting a front end and an upper end of the side surface part 33 is formed into an arc surface or a C-shaped surface with a cut corner. The back part 34 is vertically provided upward from the rear end of the bottom surface part 32, and is provided in such a manner as to couple the pair of left and right side surface parts 33. The heights by which the pair of left and right side surface parts 33 and the back part 34 protrude from the bottom surface part 32 become the same.

With this configuration, the accommodation part 31 is formed by the bottom surface part 32, the pair of left and right side surface parts 33, and the back part 34. The accommodation part 31 can be said to be an accommodation space including an upper opening 35 formed by upper ends of the pair of left and right side surface parts 33 and an upper end of the back part 34, and a front opening 36 formed by a front end of the bottom surface part 32 and front ends of the pair of side surface parts 33, and contiguous to the upper opening 35.

By the accommodation part 31 including the front opening 36 and the upper opening 35 formed contiguously to the front opening 36, it is possible to obtain good operability when a customer accommodates a basket containing a product, into the accommodation part 31. Specifically, the customer needs not hold the basket up over the upper end of the side surface part 33, and can accommodate the basket into the accommodation part 31 by sliding the basket rearward from the front opening 36. In addition, the customer can also accommodate the basket into the accommodation part 31 by causing the basket to pass from the obliquely-upside of the reading unit 30 toward the upper opening 35 and the front opening 36.

In addition, a peripheral surface part 38 is formed by the pair of left and right side surface parts 33, the back part 34, and the front opening 36. In other words, the front opening 36 is an example of a peripheral surface opening part that is formed in the peripheral surface part 38 vertically provided upward from the bottom surface part 32, and enables goods to be taken into and out of the accommodation part 31.

The planar antenna 14 is provided in the bottom surface part 32 with being positioned in a front-back direction central part and a left-right direction central part. In addition, the planar antenna 14 is provided in each of the pair of side surface parts 33 with being positioned in the front-back direction central part and an up-down direction central part. Under the control of the control unit 11, these antennas 14 appropriately transmit carrier waves (radiowaves), and receive answering waves (radiowaves) corresponding to the carrier waves, from a wireless tag.

It is desirable to set high directionality to prevent carrier waves transmitted by the antennas 14 provided in the bottom surface part 32 and the side surface part 33, from diffusing in the front-back direction. This is because radiowaves can be prevented from being exchanged with a wireless tag positioned on the outside of the accommodation part 31, by preventing radiowaves from leaking from the front opening 36 as far as possible. This prevents tag information of a wireless tag attached to a product other than a product to be purchased by a customer, from being read (hereinafter, will also be referred to as erroneous reading).

Note that there is no need to provide a plurality of antennas 14. For example, the antenna 14 may be provided only in the bottom surface part 32, or only in one of the side surface parts 33, but it is desirable that the antenna 14 is provided in the bottom surface part 32. This is because, since the pair of side surface parts 33 and the back part 34 are vertically provided around the bottom surface part 32, and three side of four sides of the bottom surface part 32 are covered, radiowaves emitted from the antenna 14 provided in the bottom surface part 32 are less likely to leak to the outside of the accommodation part 31.

A radiowave absorber 39 is provided at a front end portion on the top surface of the bottom surface part 32. In addition, radiowave absorbers 39 are provided also at front end portions on the inner surfaces of the pair of side surface parts 33. These radiowave absorbers 39 are formed of ferrite or the like, for example, into a planar shape, and are attached in such a manner as to face the inside of the accommodation part 31. By providing these radiowave absorbers 39, it is possible to prevent radiowaves from leaking from the front opening 36, and suppress erroneous reading.

Note that the radiowave absorbers 39 may also be provided at upper end portions of the side surface parts 33 and the back part 34, and radiowave leakage from the upper opening 35 may be prevented. In the present embodiment, by focusing attention on the fact that a product other than a product to be purchased by a customer is normally not positioned above the self POS terminal 1 installed in the payment counter, that is to say, by focusing attention on the fact that erroneous reading attributed to radiowave leakage from the upper opening 35 does not normally occur, the radiowave absorbers 39 are provided only near the front opening 36. With this configuration, cost reduction is achieved by reducing the number of the radiowave absorbers 39.

In addition, in the present embodiment, the reading unit 30 is formed into a cuboid shape in such a manner that cuboid baskets generally used in stores are easily accommodated, but the shape of the reading unit 30 is not limited to this. For example, the reading unit 30 may have a cylindrical shape or a shape including a curve.

Figure 4:
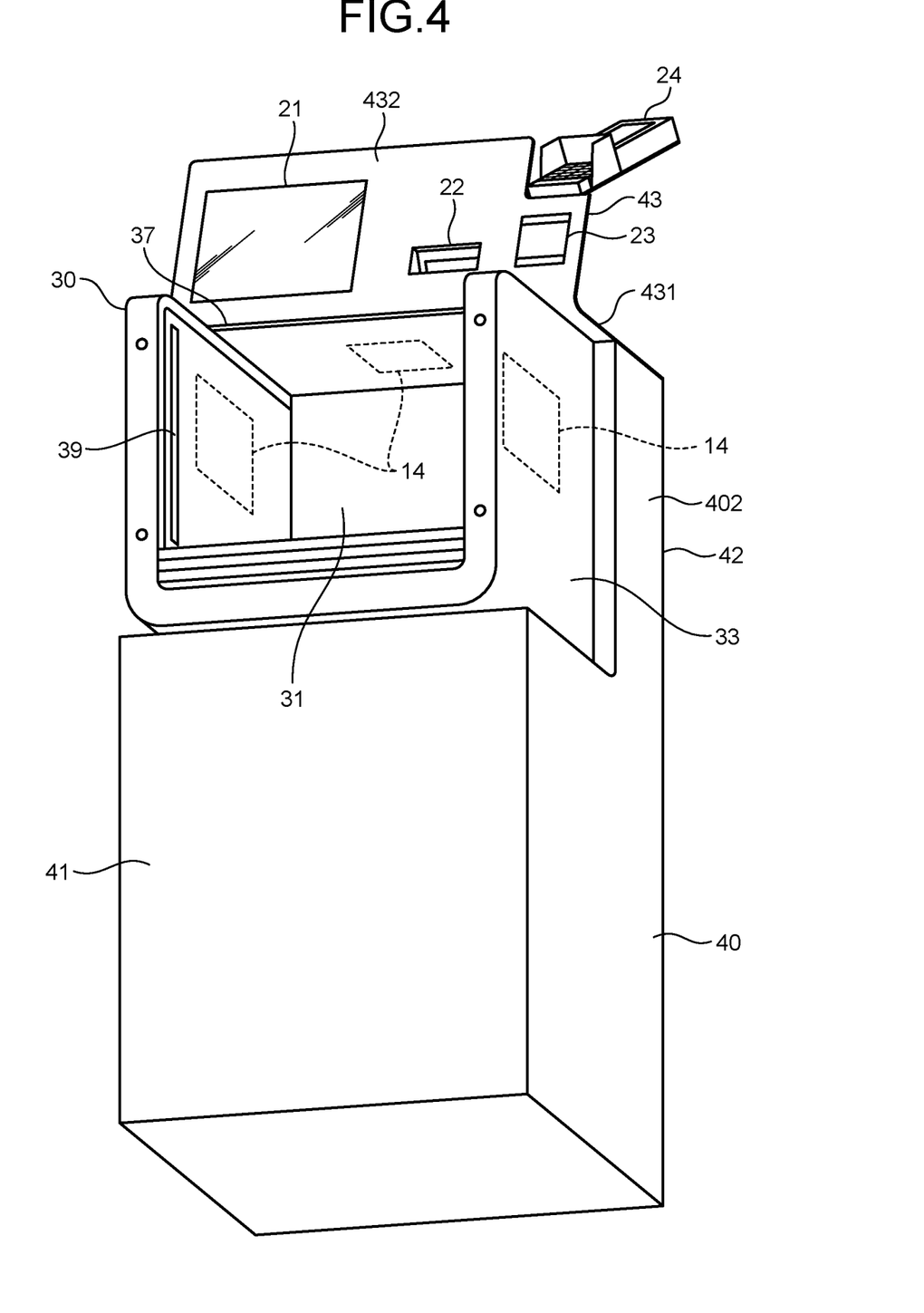
FIG. 4 is a view illustrating the external appearance of a state in which a reading unit according to an embodiment is incorporated into a housing, and is a perspective view illustrating the arrangement of antennas.

FIG. 4 is a view illustrating the external appearance of a state in which the reading unit 30 is incorporated into the housing 40. The reading unit 30 is placed on the housing lower part 41.

The housing back part 42 covers the back part 34 (refer to FIG. 3) of the reading unit 30, and covers rear side portions of the respective side surface parts 33. Specifically, the housing 40 includes a back surface 401 (refer to FIG. 6), and a pair of side surfaces 402 protruding forward from left-right direction both end parts of the back surface 401. Then, the back surface 401 covers the rear side of the back part 34, and the side surfaces 402 cover rear side portions of left-right direction outer surfaces of the respective side surface parts 33.

The housing upper part 43 includes a horizontal cover part 431 protruding forward from an upper end of the housing back part 42, and a support part 432 bending from a front end part of the cover part 431.

The cover part 431 is arranged in such a manner as to connect rear side portions at the upper ends of the respective side surface parts 33. With this configuration, a rear side portion of the upper opening 35 (refer to FIG. 3) of the reading unit 30 is covered by the cover part 431, and the accommodation part 31 is positioned also below the cover part 431. In other words, the cover part 431 covers a part of the upside of the accommodation part 31. The cover part 431 can reflect a part of radiowaves emitted upward from the antenna 14 provided in the bottom surface part 32. This can suppress a decline in radio field intensity inside the accommodation part 31. Note that the cover part 431 may be provided in the reading unit 30 instead of the housing 40.

In a state in which the rear side portion of the upper opening 35 is blocked by the cover part 431, a top surface opening part 37 contiguous to the peripheral surface opening part (the front opening 36) is formed by the cover part 431 and the peripheral surface part 38. Specifically, the top surface opening part 37 is formed by a front end of the cover part 431 and upper ends of the pair of left and right side surface parts 33. In other words, a portion in which a part of the upper opening 35 is blocked corresponds to the top surface opening part 37. Note that the cover part 431 may be positioned below the upper ends of the side surface parts 33. In this case, the top surface opening part 37 is formed below upper ends of the pair of left and right side surface parts 33.

In addition, the planar antenna 14 is provided in the cover part 431 with being positioned in a left-right direction central part and a front-back direction central part. The antenna 14 provided in the cover part 431 emits radiowaves toward the bottom surface part 32.

The support part 432 is provided contiguously to the cover part 431, and is provided with being inclined with respect to a horizontal surface by the upper end being positioned posterior to the lower end. The support part 432 supports component parts (component, device, etc.) included in the sales data processing apparatus 20. Specifically, the support part 432 supports the display 21, the receipt issuance port 22, the scanner 23, and the card reader 24. Note that the support part 432 may support component parts included in the wireless tag reading apparatus 10. For example, in a case where the wireless tag reading apparatus 10 includes a display that displays various types of information, and an operation unit to be operated by a customer, the support part 432 may support the display and the operation unit. In addition, the printer 26 that prints a receipt to be discharged from the receipt issuance port 22 is installed above the cover part 431.

The cover part 431 that covers a part of the upside of the accommodation part 31 prevents radiowaves from leaking from the upside of the accommodation part 31, by reflecting at least a part of radiowaves emitted from the antenna 14. In particular, because the antenna 14 that emits radiowaves upward is provided in the bottom surface part 32, radiowaves easily leak from the upper opening 35, but by providing the cover part 431, it is possible to reflect radiowaves transmitted from the antenna 14 in the bottom surface part 32. Thus, radiowaves in the accommodation part 31 become intense, and it is possible to improve reading performance of a wireless tag attached to a product accommodated in the accommodation part 31.

Furthermore, the antenna 14 is attached to the cover part 431. With this configuration, because the antenna 14 can be arranged also on the upside of the accommodation part 31, it is possible to improve reading performance of tag information of a wireless tag attached to goods accommodated in the accommodation part 31. In addition, in providing the antenna 14 on the upside of the accommodation part 31, the cover part 431 can be used as an antenna attachment part. Thus, there is no need to separately provide an antenna attachment part, and the structure of the wireless tag reading apparatus 10 can be simplified. The antenna 14 provided in the cover part 431 can surely read tag information of a wireless tag attached to a product accommodated in the upper part of the accommodation part 31, and contributes to improvement in reading performance of tag information. Moreover, the cover part 431 can use its top surface as a placement part. For example, the cover part 431 can also function as a placement part on which the printer 26 included in the sales data processing apparatus 20 is placed.

Figure 5:
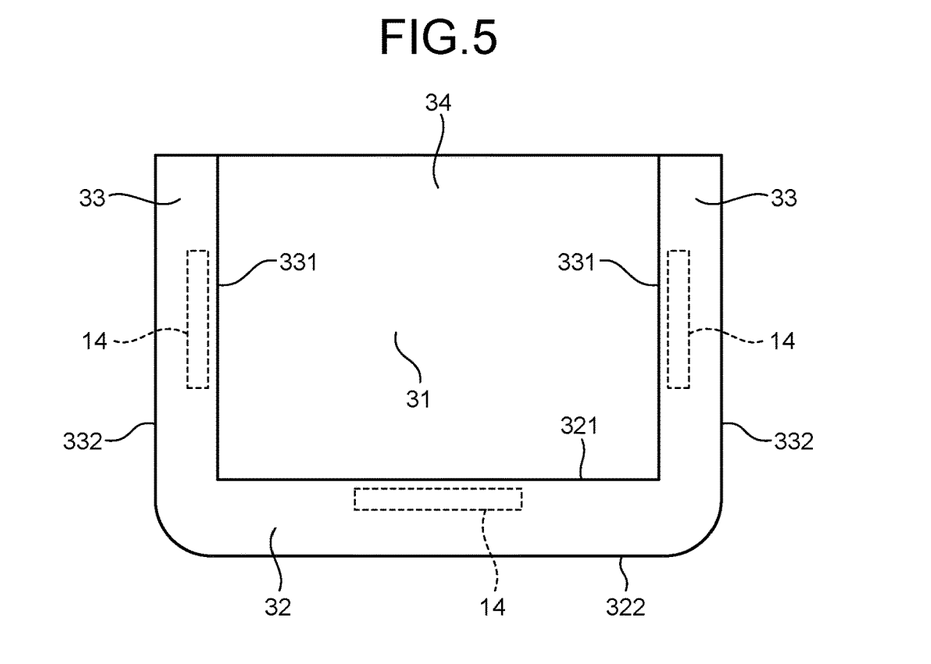
FIG. 5 is a view illustrating a main part cross section in a left-right direction of a reading unit according to an embodiment.
Figure 6:
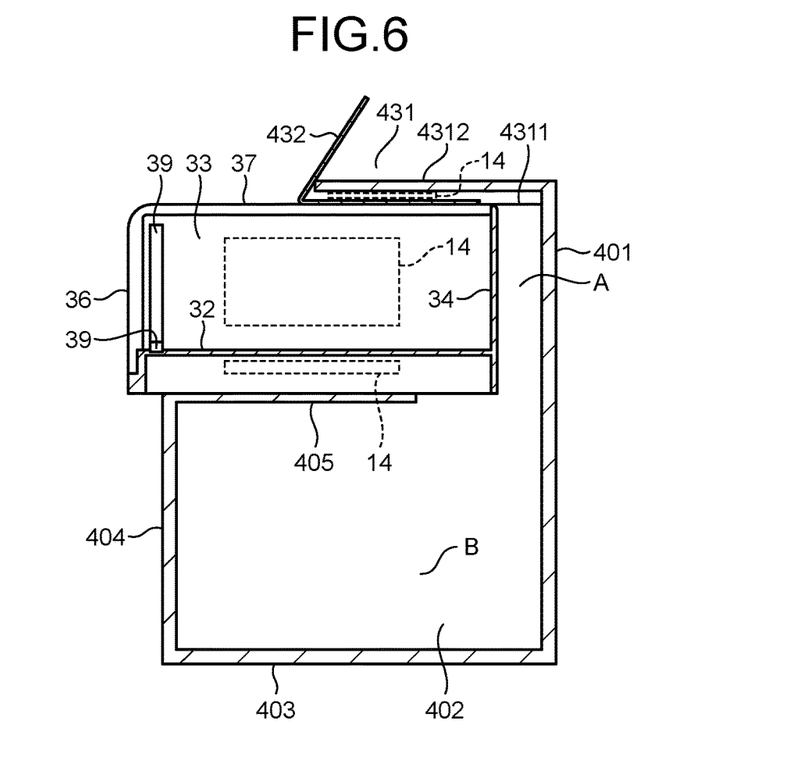
FIG. 6 is a view illustrating a main part cross section in a front-back direction in a state in which a reading unit according to an embodiment is incorporated into a housing.

Next, internal configurations of the reading unit 30 and the housing 40 will be described. FIG. 5 is a view illustrating a main part cross section in the left-right direction of the reading unit 30, and FIG. 6 is a view illustrating a main part cross section in the front-back direction in a state in which the reading unit 30 is incorporated into the housing 40.

As illustrated in FIG. 5, the bottom surface part 32 of the reading unit 30 includes an inner surface 321 facing the accommodation part 31, an outer surface 322 separated from the inner surface 321 by a predetermined distance, and the antenna 14 arranged in a space formed by the inner surface 321 and the outer surface 322. The inner surface 321 is formed of radiowave permeable material with high radiowave permeability, such as wood, for example. The outer surface 322 is formed of radiowave reflective material with high radiowave reflectivity, including metal such as aluminum, for example.

Each of the side surface parts 33 similarly includes an inner surface 331 facing the accommodation part 31, an outer surface 332 separated from the inner surface 331 by a predetermined distance, and the antenna 14 arranged in a space formed by the inner surface 331 and the outer surface 332. The inner surface 331 is formed of radiowave permeable material with high radiowave permeability, and the outer surface 332 is formed of radiowave reflective material with high radiowave reflectivity.

The back part 34 is formed of plate-like radiowave permeable material. The antenna 14 is not provided in the back part 34. This is because, if the antenna 14 is provided in the back part 34, radiowaves become more likely to leak from the front opening 36 facing the back part 34. Products or the like that are to be carried by customers other than a customer who makes payment, or store salespersons are assumed to be positioned in front of the self POS terminal 1. Thus, if radiowaves leak from the front opening 36, erroneous reading occurs in some cases. The wireless tag reading apparatus 10 of the present embodiment therefore prevents erroneous reading by avoiding providing the antenna 14 in the back part 34.

As illustrated in FIG. 6, the housing 40 includes the back surface 401, the both side surfaces 402, a bottom surface 403, a front surface 404, a placement surface 405, the cover part 431, and the support part 432.

The back surface 401 is formed of radiowave reflective material, and provided at a position separated from the back part 34 of the reading unit 30 by a predetermined interval. That is, a space A is formed between the back part 34 and the back surface 401. The both side surfaces 402, the bottom surface 403, the front surface 404, and the placement surface 405 of the housing 40 are also formed of radiowave reflective material, and a space B is formed by these. The space B is connected with the space A.

The cover part 431 includes an inner surface 4311 facing the accommodation part 31, an outer surface 4312 separated from the inner surface 4311 by a predetermined distance, and the antenna 14 arranged in a space formed by the inner surface 4311 and the outer surface 4312. The inner surface 4311 is formed of radiowave permeable material with high radiowave permeability, and the outer surface 4312 is formed of radiowave reflective material with high radiowave reflectivity. In this manner, the outer surface of the housing 40 is formed of radiowave reflective material, and tag information of a product provided on the outside of the self POS terminal 1 is prevented from being read, by preventing radiowaves from leaking to the outside of the self POS terminal 1.

As described above, a product other than a product to be purchased by a customer is normally not positioned above the self POS terminal 1 arranged in the payment counter. On the other hand, products carried by other customers and a store salesperson are sometimes positioned in front of the self POS terminal 1, and the wireless tag reading apparatus 10 is desired to avoid erroneously reading tag information of wireless tags attached to these products. Thus, by employing the above-described configurations of the reading unit 30 and the housing 40, the wireless tag reading apparatus 10 of the present embodiment prevents radiowaves from leaking from the front opening 36 of the reading unit 30 and prevents erroneous reading.

Specifically, first of all, in the reading unit 30, the antenna 14 is not provided in the back part 34 facing the front opening 36. By avoiding providing the antenna 14 that transmits radiowaves toward the front opening 36, it is possible to prevent radiowave leakage from the front opening 36. Next, the back part 34 is formed of radiowave permeable material. With this configuration, it is possible to prevent radiowaves emitted from the antennas 14 provided in the bottom surface part 32, the respective side surface parts 33, and the cover part 431, from being reflected by the back part 34 toward the front opening 36. A part of radiowaves emitted from these antennas 14 is reflected by the back part 34 formed of radiowave permeable material, but its reflection amount is reduced.

Furthermore, the space A is provided between the back part 34 of the reading unit 30 that is formed of radiowave permeable material, and the back surface 401 of the housing 40 that is formed of radiowave reflective material, and the space B connected with the space A is provided. Among radiowaves emitted from the antennas 14, a part of radiowaves transmitted through the back part 34 made of radiowave permeable material progresses in a direction in which a shielding object does not exist. In other words, the part of radiowaves progresses in a direction heading for the space B from the space A. With this configuration, it is possible to reduce radiowaves reflected toward the front opening 36. Moreover, a corner part connecting a front end and an upper end of the side surface part 33 is formed into an arc surface or a C-shaped surface with a cut corner. By avoiding making the corner part into an edge, radiowaves are prevented from being emitted again to the outside of the accommodation part 31 from an edge.

Note that a control circuit that forms the control unit 25 of the sales data processing apparatus 20 and another component part may be accommodated in the space B. In this case, a wire for connecting the display 21, the scanner 23, and the card reader 24 that are supported by the support part 432, the printer 26 placed on the cover part 431, and the like with the control unit 25 installed in the space B can be provided in the space A. Space effective utilization can be thereby achieved. In addition, component parts of the wireless tag reading apparatus 10 may be accommodated in the space B. Also in this case, the space A can be used as a wiring space.

A usage method of the self POS terminal 1 having the above-described configuration will be described. A customer puts a product that is to be purchased, into a basket, moves to the self POS terminal 1, and accommodates the basket containing the product, into the accommodation part 31.

At this time, because the front opening 36 is formed in the accommodation part 31, the customer can accommodate the basket into the accommodation part 31 by sliding the basket rearward from the front opening 36 without holding the basket up. In addition, because the top surface opening part 37 contiguous to the front opening 36 is formed, the customer can accommodate the basket into the accommodation part 31 also from the obliquely-upside. Accordingly, the operability of the customer becomes good.

After that, for example, if the customer touches a start button displayed on the display 21, the control unit 11 of the wireless tag reading apparatus 10 emits carrier waves from the antenna 14. Note that a sensor for detecting that the basket is accommodated into the accommodation part 31 may be provided, and the control unit 11 may emit carrier waves from the antenna 14 based on this sensor detecting the basket. In addition, the control unit 11 may perform control in such a manner that carrier waves are simultaneously emitted from the antennas 14 provided in the bottom surface part 32, the respective side surface parts 33, and the cover part 431, or may perform control in such a manner that carrier waves are emitted in a time division manner by switching the antennas 14.

If a wireless tag attached to a product accommodated in the basket receives carrier waves from the antenna 14, the wireless tag outputs answering waves in response to the carrier waves. The antenna 14 receives the answering waves output by the wireless tag. The control unit 11 reads tag information such as a product code that is included in the answering waves received by the antenna 14.

In the reading of tag information, because the cover part 431 covers a part the upside of the accommodation part 31, it is possible to prevent radiowaves emitted from the antenna 14 provided in the bottom surface part 32, from leaking from the upside of the accommodation part 31. With this configuration, the intensity of radiowaves inside the accommodation part 31 becomes intense, and it is possible to improve reading performance of tag information of a wireless tag. In addition, as described above, because radiowaves are prevented from leaking from the front opening 36 to the outside of the accommodation part 31, it is possible to prevent reading of unintended tag information.

Tag information including a read product code or the like is transmitted to the sales data processing apparatus 20. The sales data processing apparatus 20 executes account processing based on the received tag information. The customer can thereby make payment.

As described above, the wireless tag reading apparatus 10 according to an embodiment includes the accommodation part 31 formed by the bottom surface part 32 and the peripheral surface part 38 vertically provided upward from the bottom surface part 32, the peripheral surface opening part (the front opening 36) that is formed in the peripheral surface part 38, and enables goods to be taken into and out of the accommodation part 31, the cover part 431 covering a part of the upside of the accommodation part 31, the top surface opening part 37 formed by the cover part 431 and the peripheral surface part 38, and contiguous to the peripheral surface opening part (the front opening 36), and a reading part (the antenna 14 and the control unit 11) configured to read, by transmitting and receiving radiowaves to and from a wireless tag attached to goods accommodated in the accommodation part 31, tag information from the wireless tag.

With this configuration, the wireless tag reading apparatus 10 can improve operability while suppressing a decline in reading performance. Furthermore, the cover part 431 can be used as a placement part, and by placing component parts of the wireless tag reading apparatus 10 and the sales data processing apparatus 20, for example, space effective utilization can be achieved.

In addition, the wireless tag reading apparatus 10 according to an embodiment includes the reading unit 30 including the bottom surface part 32 and the peripheral surface part 38, and the housing 40 including the cover part 431 and supporting the reading unit 30, and in a state in which the reading unit 30 is supported by the housing 40, the cover part 431 covers the upper end of the peripheral surface part 38.

With this configuration, the cover part 431 for preventing radiowaves from leaking from the accommodation part 31 upward can be caused to also function as a regulation member that regulates a movement in the up-down direction of the reading unit 30 with respect to the housing 40. Thus, the configuration of the wireless tag reading apparatus 10 can be simplified.

Furthermore, in the wireless tag reading apparatus 10 according to an embodiment, the bottom surface part 32 is formed into a rectangular shape, the peripheral surface part 38 includes the pair of left and right side surface parts 33 and the back part 34 coupling the pair of side surface parts 33, and the peripheral surface opening part (the front opening 36) is formed on the front surface of the peripheral surface part 38.

With this configuration, because a user can accommodate an accommodation member such as a basket that contains goods, into the accommodation part 31 by sliding the accommodation member from the peripheral surface opening part formed on the front surface, it is possible to obtain good operability when the user accommodates goods into the accommodation part 31.

Moreover, the wireless tag reading apparatus 10 according to an embodiment includes the radiowave absorber 39 positioned on the peripheral surface opening part (the front opening 36), in at least either one of the peripheral surface part 38 or the bottom surface part 32.

With this configuration, it is possible to reduce radiowave leakage from the peripheral surface opening part (the front opening 36) to the outside of the accommodation part 31. Thus, it is possible to prevent erroneous reading of tag information of a wireless tag existing on the outside of the accommodation part 31.

Moreover, in the wireless tag reading apparatus 10 according to an embodiment, the antenna 14 that transmits and receives radiowaves to and from a wireless tag attached to goods accommodated in the accommodation part 31 is provided in the cover part 431.

With this configuration, because the antenna 14 can be provided also on the upside of the accommodation part 31, it is possible to improve reading performance of tag information of a wireless tag attached to goods accommodated in the accommodation part 31. Moreover, because the antenna 14 provided in the cover part 431 emits radiowaves toward the bottom surface part 32 in which there is no need to form an opening for taking in and out goods, radiowaves emitted from the antenna 14 are reflected by the bottom surface part 32, and radio field intensity inside the accommodation part 31 is enhanced. From this point, it is also possible to improve reading performance of tag information of a wireless tag.

In addition, in the wireless tag reading apparatus 10 according to an embodiment, a display unit (the display 21) that displays content of tag information read by the reading part (the antenna 14 and the control unit 11) is provided in the cover part 431.

With this configuration, it is possible to effectively utilize a space in the upper part of the cover part 431, and arrange the display unit at an easily viewable position. Because the user gazes at the accommodation part 31 to accommodate goods into the accommodation part 31, the display unit positioned immediately above the accommodation part 31 is considered to become easily viewable.

Heretofore, an embodiment of the present invention has been described, but this embodiment has been presented as an example, and is not intended to limit the scope of the invention. This embodiment can be executed in other various modes, and various omissions, replacements, and changes can be made without departing from the gist of the invention. This embodiment and its modification are included in the scope and gist of the invention, and are included in the scopes of the invention described in the appended claims, and its equivalent.

What is claimed is:

1. A wireless tag reading apparatus comprising:
   an accommodation part formed with a bottom surface part and a peripheral surface part vertically provided upward from the bottom surface part;
   a front opening part that is formed with a front end of the bottom surface part and a front end of the peripheral surface part, and enables goods to be taken into the accommodation part from a position in front of the wireless tag reading apparatus and out of the accommodation part to the position;
   a cover part covering a part of an upper side of the accommodation part;
   a top opening part formed with an front end of the cover part and an upper end of the peripheral surface part, the top opening part being contiguous to the front opening part; and
   a reader configured to read, by transmitting and receiving radiowaves to and from a wireless tag attached to goods accommodated in the accommodation part, tag information from the wireless tag.

2. The wireless tag reading apparatus according to claim 1, the bottom surface part and the peripheral surface part are included in a first modular unit, and the cover part is included in a second modular unit that supports the first modular unit,
   wherein the cover part covers an upper end of the peripheral surface part.

3. The wireless tag reading apparatus according to claim 1,
   wherein the bottom surface part has a rectangular shape, and
   wherein the peripheral surface part includes a pair of side surface parts and a back part coupling the pair of side surfaces.

4. The wireless tag reading apparatus according to claim 1, further comprising
   a radiowave absorber provided in at least one of the peripheral surface part or the bottom surface part at a position adjacent to the peripheral surface opening part.

5. The wireless tag reading apparatus according to claim 1,
   wherein the reader includes an antenna provided in the cover part and configured to transmit and receive radiowaves to and from the wireless tag attached to goods accommodated in the accommodation part.

6. The wireless tag reading apparatus according to claim 1, further comprising
   a display provided on the cover part and configured to display content of tag information read by the reader.

7. The wireless tag reading apparatus according to claim 6, wherein the display is provided above an upper surface of the cover part.

8. The wireless tag reading apparatus according to claim 1, wherein the reader includes
   a first antenna provided in the bottom surface part and configured to transmit and receive radiowaves to and from the wireless tag attached to goods accommodated in the accommodation part;
   a second antenna provided in the peripheral surface part and configured to transmit and receive radiowaves to and from the wireless tag attached to goods accommodated in the accommodation part; and
   a third antenna provided in the cover part and configured to transmit and receive radiowaves to and from the wireless tag attached to goods accommodated in the accommodation part.

* * * * *